Nov. 14, 1939.　　　J. E. MONIGHAN　　　2,179,578
FISHING POLE APPLIANCE
Filed Nov. 3, 1938
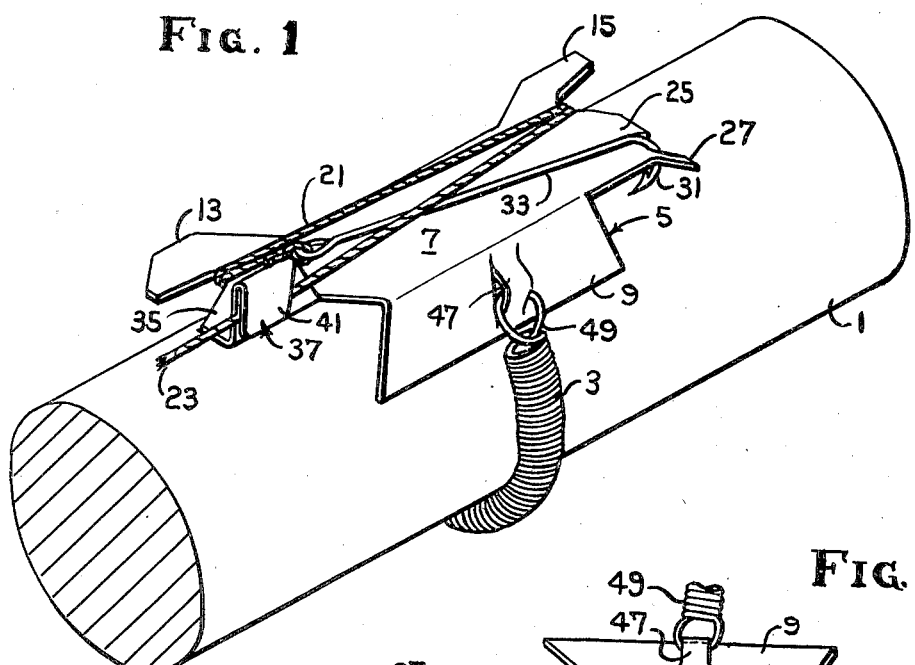
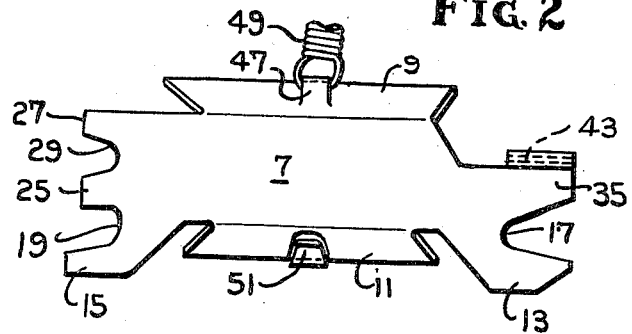
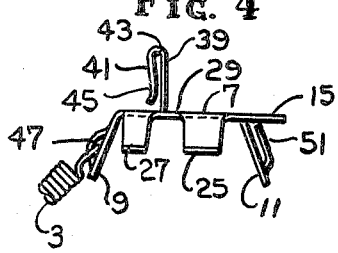
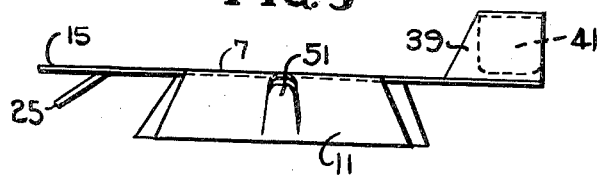
John E. Monighan
INVENTOR.
BY Edmund W. E. Kamm
ATTORNEY.

Patented Nov. 14, 1939

2,179,578

UNITED STATES PATENT OFFICE 2,179,578

FISHING POLE APPLIANCE

John E. Monighan, Allen County, Ind.

Application November 3, 1938, Serial No. 238,510

9 Claims. (Cl. 43—33)

The invention relates to a device adapted to be attached to a fishing pole for the purpose of storing excess fishing line, holding said line taut and providing a guard for receiving the hook.

An object of the invention is to provide a combination hook retaining guard and excess line holder in which the line is disposed so as to assist in preventing the release of the hook from the guard.

A further object of the invention is to provide a line storing device and hook guard which is provided with means for holding the portion of the line taut across the shank of a hook which is in position in the guard.

Yet another object of the invention is to provide a line storing device and hook guard which is simple and cheaply manufactured.

Still another object of the invention is to provide a device of the type described which may be readily attached to a fishing pole.

Other objects will become apparent from a study of the specification and attached drawing in which:

Figure 1 is an isometric view showing the device attached to a pole which is inclined with its tip end down.

Figure 2 is a plan view of the device.

Figure 3 is a side elevation viewing the device of Figure 2 from the bottom of said figure.

Figure 4 is an end elevation viewing the device from the left end of Figure 2.

Referring to Figure 1, the numeral 1 represents a section of a fishing pole tilted so that its tip extends to the left and downwardly and to which is attached, by means of a contractile spring 3 the line and hook retainer indicated generally by 5.

The latter comprises a bed plate portion 7 which is held in tangential spaced relation with respect to pole 1 by means of downwardly inclined supports 9 and 11 formed on each of its respective longitudinal edges.

Tangs 13 and 15 extend laterally of the bed plate and in the plane thereof on the same side as the support 11. The tangs also extend longitudinally of the bed to form, which projections later to be described, the recesses 17 and 19 at either end. The excess portion 21 of the fishing line 23 may be wound over the tangs and in the recesses as shown in Figure 1.

Two projections 25 and 27 are formed on one end of the bed plate 7 adjacent tang 15. These projections are inclined downwardly toward the pole 1. The projection 25 cooperates with tang 15 to form the recess 19 while the two projections form with the bed a recess 29 which is adapted to receive the curved portion 31 of the hook 33.

A projection 35 is formed on the other end of the bed plate 7 adjacent tang 13 and in the plane of the tang and bed. It cooperates with said tang to form the recess 17 previously described. The projection is provided with a vertically extending clip, indicated generally by numeral 37, which is formed by a vertically extending projection 39 which is turned downwardly as at 41 to form a downwardly open, U-shaped groove 43 adapted to receive that portion of the line running from the recess 19 to the tip of the pole where it is usually attached. The portion 41 may be curved outwardly at its lower end as shown at 45 so as to facilitate the entry of the line into the groove 43.

The support 9 is formed with a punched out "eye" 47 which is adapted to receive the end loop 49 of the spring 3. This construction insures that the spring and retainer will not become separated.

Support 11 is provided with a punched out hook 51 which opens upwardly to receive a loop (not shown) in the other end of spring 5. This structure is designed to facilitate the assembly of the retaining device on the pole.

It will be perceived from an inspection of the drawing that the device in its entirety can be formed from a flat sheet by a series of simple stamping operations carried on in suitable dies.

The operations required are a blanking operation in which all of the projections 9, 11, 13, 15, 25, 27, 35, 39, 41, and the elements 47 and 51 are formed. A forming operation follows in which the projections 9, 11, 25, and 27 are bent downwardly at the proper angle and the clip 35 is formed.

The spring loop 49 is then manually inserted in the eye 47 and the device is ready for assembly on the pole.

This is accomplished by placing the supports on the pole, bringing the spring around the pole and hooking the end loop on the hook 51.

In winding the line on the retainer, the fishing hook 33 is placed with its barbed point underneath the guard, the curved portion 31 occupying the notch 29 and the shank of the hook disposed above the bed 7. The excess line is then carried to recess 17 and under the tangs 13 and 15 to recess 19. It is wound between these recesses a sufficient number of times to take up the excess line and thence it is carried from recess 19, across the shank of the hook into the U-shaped groove 43 which being of smaller width than the diameter of the line, firmly retains the line so that all the line wound on the device is held taut and the hook is held in the described position where it cannot harm the person handling the rod. The entire device may then be slid downwardly on the rod to draw taut the portion of the line extending between the clip 37 and the tip of the pole.

It will be seen that the common failing of prior art devices of this type is avoided; that is, even if the line reaching from the device to the tip of the pole becomes slack through yielding of the line or flexing of the pole, the hook and excess line will not come free of the device.

In the event a hook having a short shank is utilized, that portion of the line extending from recess 19 to clip 37 will cross over the line leading from the hook to recess 17 with the same result described above.

The entire appliance with the exception of spring 3 may be rustproofed after being formed although I prefer to use an oxidized steel from which to cut the blanks.

It is obvious that various changes may be made in form, construction and arrangement of parts without departing from the spirit of the invention and applicant does not, therefore, desire to be restricted to the exact form of the device disclosed herein for purposes of description of the invention but rather he desires protection falling fairly within the scope of the appended claims.

What I consider to be new and desire to protect by Letters Patent of the United States of America is:

1. In a fishing pole appliance the combination of a bed plate, supporting means for maintaining said plate in spaced relation with said pole, said means including downwardly turned projections at one end of said plate forming a hook receiving notch, a friction device formed at the end of said plate opposite the notch, and means disposed at one side of said plate forming recesses at either end of said plate adjacent said notch and friction device respectively.

2. In a fishing pole appliance the combination of a bed plate, supporting means for maintaining said plate in spaced relation with said pole, said means including downwardly turned projections at one end of said plate forming a hook receiving notch, and a friction device formed at the end of said plate opposite the notch and adapted to hold in place a hook engaged in said notch.

3. In a fishing pole appliance the combination of a bed plate, supporting means for maintaining said plate in spaced relation with said pole, said means including downwardly turned projections at each longitudinal edge of said plate and forming with said plate a cavity for the reception of the point of a hook, means on the end of said plate for holding said hook laterally in place.

4. In a fishing pole appliance, the combination of a bed plate, means for supporting said plate in spaced tangential relation with respect to said pole and forming with said plate and pole, a hook receiving compartment, a line engaging friction device extending above said bed plate and adapted to hold a hook in place in said compartment.

5. In a fishing pole appliance the combination of a bed plate, means for supporting said plate in spaced tangential relation with respect to said pole to form, with said plate and pole, a hook receiving compartment, projections extending from a longitudinal edge of said bed plate to form opposed recesses adapted to receive successive coils of a line.

6. In a fishing pole appliance the combination of a bed plate, means for supporting said plate in spaced tangential relation with respect to said pole to form with said plate and pole a hook receiving compartment, projections extending from a longitudinal edge of said bed plate to form opposed recesses, a line holding friction device formed at one end of said bed plate adjacent a recess, means at the opposite end of said plate for laterally restraining said hook, said recesses, friction device and restraining device being so disposed that a line joining the restraining device with the recess at the end of the bed plate opposite said device will be crossed, at substantially its midpoint, by a line joining the friction device with the recess at the end opposite said device.

7. In a fishing pole appliance the combination of a bed plate, supporting means for maintaining said plate in spaced relation with said pole, including downwardly turned projections at each longitudinal edge of said plate and forming with said plate a cavity for the reception of the point of a hook, means on the end of said plate for holding said hook laterally in place, a resilient attaching means, means forming a closed loop in one of said projections adapted to receive one end of said resilient means, and means forming an upwardly open hook in the other of said projections for receiving the other end of said resilient means.

8. In a fishing pole appliance a bed plate, means for supporting said bed plate on a pole in tangentail relation thereto, means on one edge of said plate for receiving a hook, line retaining friction means on the opposite edge of said plate, said friction means comprising a U-shaped spring metal clip having its walls spaced at a smaller distance than the diameter of the fishing line to be retained.

9. In a fishing pole appliance, a bed plate, means for supporting said bed plate on a pole, and line receiving friction means comprising a U-shaped clip mounted on said bed plate in a plane substantially perpendicular to the plane of said plate.

JOHN E. MONIGHAN.